United States Patent [19]

Fischer et al.

[11] Patent Number: 4,509,246
[45] Date of Patent: Apr. 9, 1985

[54] METHOD AND A DEVICE FOR SECURING DOUBLE-WALL PANELS TO SUBSTRUCTURES

[75] Inventors: Artur Fischer, Weinhalde 34, 7244 Waldachtal 3/Tumlingen; Horst Walther, Heidelberg, both of Fed. Rep. of Germany

[73] Assignee: Artur Fischer, Tumlingen/Waldachtal, Fed. Rep. of Germany

[21] Appl. No.: 532,442

[22] Filed: Sep. 14, 1983

[30] Foreign Application Priority Data

Sep. 15, 1982 [DE] Fed. Rep. of Germany ....... 3234188

[51] Int. Cl.³ .......................... B23D 19/00; E04B 5/52
[52] U.S. Cl. ..................................... 29/526 R; 52/486
[58] Field of Search ............... 29/526 R; 52/489, 486, 52/769

[56] References Cited

U.S. PATENT DOCUMENTS

| | | | |
|---|---|---|---|
| 2,480,241 | 8/1949 | Hensel | 52/486 |
| 3,621,635 | 11/1971 | DeLange | 52/486 |
| 3,831,895 | 8/1974 | Schubert | 52/486 |
| 3,903,670 | 9/1975 | Robinson | 52/489 |
| 3,903,671 | 9/1975 | Guin | 52/489 |
| 4,028,859 | 6/1977 | Bellagamba | 52/489 |
| 4,034,535 | 7/1977 | Dustmann | 52/486 |

FOREIGN PATENT DOCUMENTS 3039917A 5/1982 Fed. Rep. of Germany .

Primary Examiner—Howard N. Goldberg
Assistant Examiner—Steven E. Nichols
Attorney, Agent, or Firm—Michael J. Striker

[57] ABSTRACT

A method of securing a double-wall panel having a plurality of hollow chambers to a substructure of a greenhouse or the like, which has a number of crossing rods. A number of clamping devices spaced from each other are mounted on the transversal rods of the substructure. Each clamping device includes a hooked anchor inserted into the wall of the panel and a U-shaped clamp connected to the anchor and placed over the transversal rod. One clamping device is positioned on the rod in the center of the lower wall of the panel and is secured to that wall to produce a central anchorage, which is immovable in all directions. Two lateral clamping devices are positioned on the same rod at each side from the central clamping device. The U-shaped clamps of the lateral clamping devices are placed over the rod with play.

4 Claims, 5 Drawing Figures

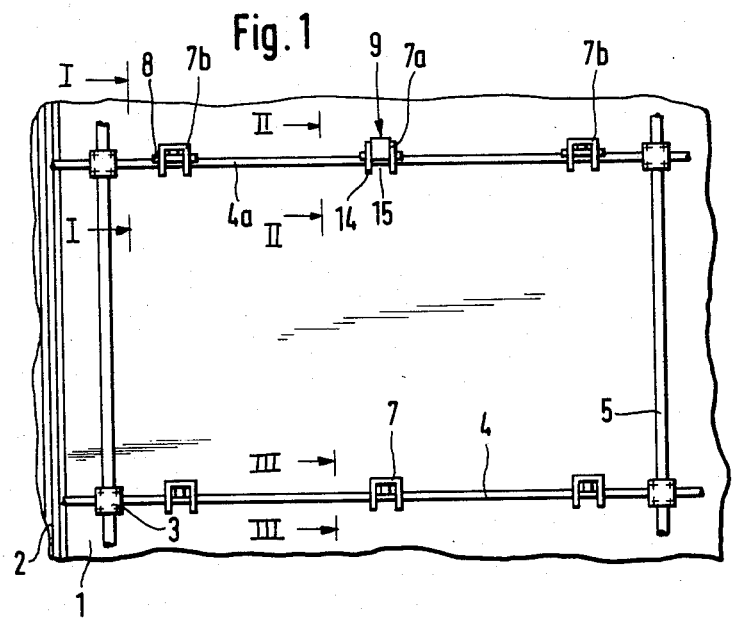
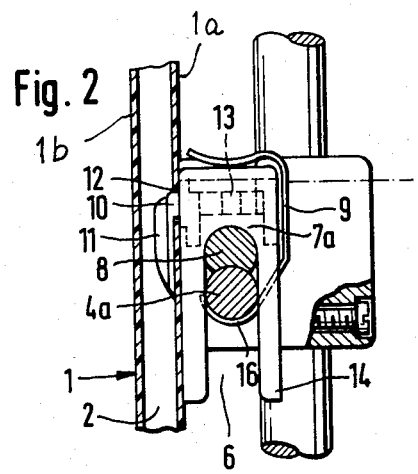

METHOD AND A DEVICE FOR SECURING DOUBLE-WALL PANELS TO SUBSTRUCTURES

BACKGROUND OF INVENTION

The present invention pertains to a method and a device for securing a double-wall panel comprised of two parallel cover plates or walls and cross-pieces connecting those plates to form hollow chambers to a substructure of such constructions as a greenhouse, protective cabin, or the like.

The substructures, to which these so-called hollow-chamber panels should be secured, usually include a number of elongated rods crossing each other at a predetermined distance and connected to each other by a suitable fastening means.

Securing devices for fastening the panel formed with hollow chambers to the elongated strut of the substructure are known in the art. One of such devices is described in the German Offenlegungsschrift DE-OS No. 30 39 917. The known device includes an anchor having a number of hooks inserted into the respective holes drilled in one of the cover plates of the panel, and a U-shaped clamping element, which can be connected to the connecting piece of the anchor and can be placed over the transversal strut or rod of the substructure. The panel is therefore secured to the substructure, in such a manner that the expansion of the panel caused due to temperature fluctuations is possible without the panel being damaged. However, in order to provide for a necessary alignment of the components of the fastening device during the assembly of the panel to the substructure, on the one hand, and to provide means for the receiving the weight of the panel in the event of sloping or vertically extended walls, on the other hand, a fixing means is necessary, which does not hinder a possible expansion of the panel.

SUMMARY OF THE INVENTION

It is an object of the present invention to provide an improved method and fastening device for securing a hollow-chamber panel to elongated struts of the substructure.

It is a further object of the present invention to provide a method of fastening a hollow-chamber panel to the substructure, which facilitates assembly and provides a reliable fastening without requiring drilling holes in the upper cover plate of the panel, which forms the outer surface of the panel.

These and the other objects of the invention are attained by a method of securing double-wall panels, each being formed of by the upper cover plate and a lower cover plate spaced from each other and connected to each other by parallel cross-pieces to form hollow chambers, to a substructure having transversal rods by means of a plurality of fastening devices, each including a hook-shaped anchor insertable into at least one hole in the lower cover plate of the panel and a U-shaped clamping member connectable to the anchor and adapted to be placed over the respective rod, and securing the lower cover plate of the panel to the respective transversal rod, the method comprising positioning one of the fastening devices on the transversal rod in the center of the panel and securing said one fastening devices to the rod so as to rigidly hold it on said one rod to produce an anchorage immovable in all directions, and positioning laterally of said one fastening device and at a distance therefrom, on said transversal rod at least one further fastening device, which is placed over said one rod and connected to the lower cover plate of the panel in a self-supporting manner.

In the case of hollow-chamber panel formed of polycarbonate, the expansion due to temperature fluctuations usually allowed for, is approximately 6 mm per meter of the panel length, taking into account intensive insolation, which should be provided, and temperatures below zero in winter. The approximately 6 m long and 2 m wide panels used in the construction of greenhouses expand about 36 mm lengthwise and 12 mm widthwise. If it is assumed that the temperature during assembly is approximately the mean temperature of the differences in the temperature to be taken into account, the fastening means must allow a play for expansion corresponding to approximately half the total expansion. The arrangement of the anchorage in the center of the lower plate in turn produces a further halving of the play for expansion, so that a maximum play of 9 mm has to be allowed for at the ends of the panel in the longitudinal direction. If there is the same play in the fastening devices positioned laterally of the central fastening device, the panel can expand from the anchorage in all directions without distortion of the panel, and hence damage to the panel.

The panel could, however, turn about the central anchorage, which would act as an axis of rotation, at least by the amount of the play provided by the rest of the fastening devices. This is prevented by the fastening devices located on each side of the central anchorage and at a distance therefrom, which devices are mounted rigidly on the same cross-strut as the central anchorage, which prevents the panel from extending in the longitudinal direction in this plane. Because it is supported on the cross-strut or rod, the panel can no longer twist. Furthermore, expansion of the panel widthwise from the anchorage is not impeded. In addition, the two lateral fastening or clamping devices help to carry the weight of the panel.

According to a further feature of the invention, each of the clamping members of all said fastening devices is placed over said one transversal rod with a play, and a distance bar may be placed between said rod and the clamping member of said one fastening device producing the anchorage to take up the play formed therebetween.

The fastening devices are assembled in such a manner that the transversal rods have the maximum play necessary with respect to the base of the U-shaped clamping members. In the case of the rod having thereon the central anchorage and the two lateral supports, this play is taken by inserting a distance piece in the central anchorage device. The clamping member of this device is thus supported directly on the transversal rod via the distance piece. This measure simplifies assembly and prevents possible errors in assembly caused by variations in the placement of the clamping members.

The objects of the present invention are further attained by a fastening arrangement for securing double-wall panels, each being formed by an upper cover plate and a lower cover plate spaced from each other by parallel cross-pieces to form hollow chamber, to a substructure having transversal rods, comprising a plurality of fastening devices located on said transversal rods in spaced relation from each other and each including a hook-shaped anchor insertable into at least one hole in the lower cover plate of the panel, and U-shaped clamping member connectable to the anchor and adapted to be placed over the respective transversal rod, one of said fastening devices being placed on the transversal rod in the center of the panel and further comprising a stirrup having a loop embracing said transversal rod and clamped on the U-shaped clamping member of said one fastening device.

The U-shaped clamping member of said one fastening device may be formed with a recess through which said stirrup passes, said stirrup having a clamping strap supported on the anchor so as to clamp said anchor, said U-shaped member and said transversal rod together.

The device forming the central anchorage can be held on the transversal rod, by, for example, pinning or screwing the device to the transversal rod. In a development of the invention, the fastening device can be held in an especially advantageous manner, without the use of auxiliary tools, by means of the stirrup, which has the loop for receiving the transversal rod and a clamping strap, which is supported on the outer surface of the connecting bar of the anchor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a side partial view of a panel with hollow chambers, secured to transversal rods of a substructure; and FIG. 2 is a sectional view on line II—II of FIG. 1, showing a fastening device with a clamping member and an anchor.

DETAILED DESCRIPTION OF THE PREFERRED EMBODIMENT

Figure 3:
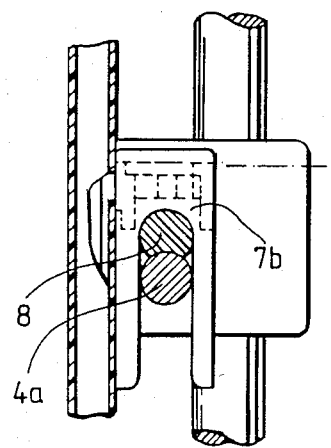
FIG. 3 is a sectional view on line I—I of FIG. 1, showing the same fastening device as FIG. 2 but without the stirrup.
Figure 4:
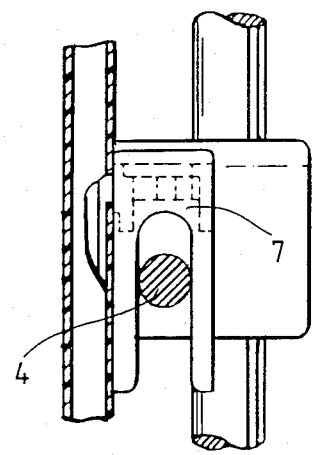
FIG. 4 is a sectional view on line III—III of FIG. 1, showing the same fastening device as FIG. 2 but without the stirrup and the distance bar.

Referring now to the drawings, panel 1, which is preferably made from polycarbonate, has a lower cover plate 1a and an upper cover plate 1b spaced from each other and connected to each other parallel longitudinal cross-pieces 2. Such panels can be utilized for coverings of greenhouses, protective cabins or the like.

The substructure, to which the hollow-chamber panel is to be secured, includes parallel transversal struts 4 and parallel vertical rounded rods 5, the latter being secured to horizontally extended struts 4 by means of junction elements 3, which may be of any suitable conventional construction. It is to be realized that other suitable constructions of substructures for the panels can be used. It is only essential that the diameter of struts 4 having a circular cross-section should be matched to the width of a receiving recess 6 formed between two parallel legs 14 of a U-shaped clamping member 7 so that the clamping member 7 when placed on the strut 4 can be displaced in both the longitudinal and transversal directions of the hollow-chamber panel 1.

It should be noted that FIG. 1 shows a portion of panel 1 and in practice a transversal rod or strut 4a, which is the upper strut in FIG. 1, should be located approximately in the center of panel 1 in the longitudinal direction thereof. Three clamping devices are shown on the upper transversal rod 4a, of which the central clamping device 7a is constructed as an anchorage on the rod 4a and side clamping devices 7b are located at approximately equal distance from central clamping device 7a and constructed as supports.

Figure 5:
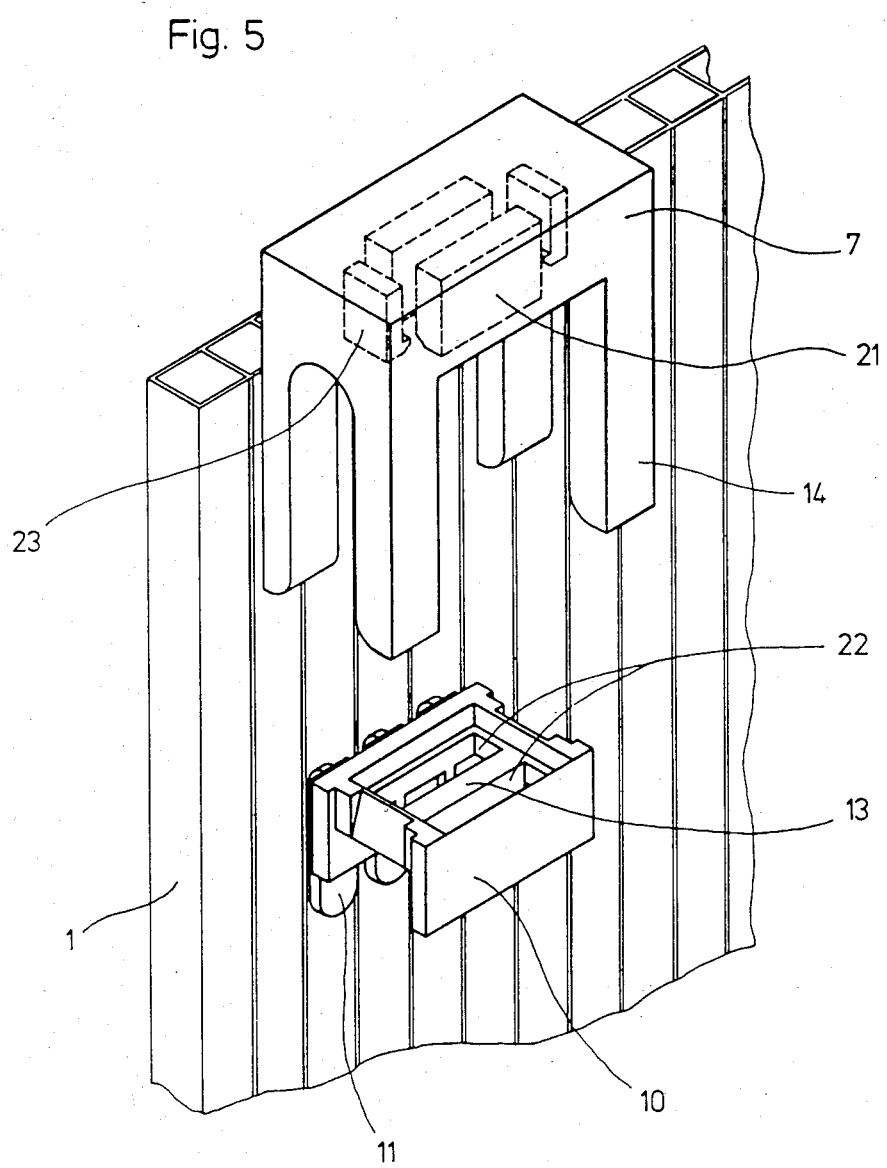
FIG. 5 is a perspective view of the fastening device when the clamping member and anchor are not assembled.

With reference to FIG. 2 and 5, it is shown that the central clamping device 7a comprises an anchor 10 formed with one or more hooks 11, which are inserted into special holes 12 drilled in the lower cover plate or wall 1a. If a number of hooks are provided on the anchor 10, these hooks extend parallel to each other and are hooked into parallel holes. The anchor 10 has a connecting bar 13, which projects at right angles from the panel 1. U-shaped clamping member 7a is clipped into the connecting bar 13 in such a manner that the legs 14 of clamping member 7a are placed over the transverse rod 4a.

Fixing of the clamping member 7 in the anchor 10 results from the two rips 21 being placed at the clamping member 7, which catch in the two openings 22 of the connecting bar 13 of the anchor 10. The two spring elements 23 being also placed at the clamping member 7 hold the clamping member 7 and the anchor 10 together.

A play is deliberately provided between the base of the U-shaped clamping member 7a in the case of the central transversal rod (the upper strut 4a in FIG. 1); this play is taken up by means of a distance bar 8 of circular cross-section. The central fastening device further includes a stirrup 9, which provides for an additional locking of the panel on the substructure, namely on the transversal rod 4a. The stirrup 9 is fitted in the case of the central clamping device, which forms the anchorage. The stirrup 9 has a loop 16, which in assembly embraces the transversal rod 4a. The stirrup 9 fits into a recess 15 formed in one of the legs 14 of clamping member 7a; recess 15 starts at the free end of the leg 14 so that the loop 16 of the stirrup 9 can be hooked onto the transversal rod 4a. Thus the stirrup 9 braces the transversal rod 4a and the clamping member 7a so that due to the increase in friction, the whole clamp is held in such a manner that at this point, there is no possibility of displacement of the clamp; the displacement in all directions can be caused as has been mentioned above by expansion of the panel.

With reference to FIG. 3, it is showing that the two lateral supporting clamping devices 7b mounted on the same transversal rod 4a with the distance bar being put underneath of the clamping devices 7b, permit transversal displacement but stabilize the panel against rotation about the anchorage formed by the clamping device 7a. All three clamping devices 7a, 7b take the weight of panel 1. As a result of the play provided in all the remaining clamping devices 7, according to FIG. 3, panel 1 can expand without distortion occurring between the clamps and leading to damage to the panel or to the clamping elements or to buckling of the panel.

The clamping device of the invention, which comprises the anchor 10 and the U-shaped clamping member 7 absorbs compressive and suction forces acting on the hollow-chamber panel 1.

In the clamping devices 7a, 7b forming an anchorage and two lateral supports the play set during the assembly between the transversal rod 4a and the base of the U-shaped clamping member is taken up by the distance bar 8 so that the clamping member is supported directly on the transversal rod 4a via the distance bar. The stirrup 9 has an upper portion 20 formed as a clamping strap and supported on the outer surface of the connecting bar 13, whereby, the anchor 10, clamping U-shaped member 7a and transverse rod 4a are clamped together.

Each fastening or clamping device 7b includes the same components as clamping device 7a with the exception of and stirrup 9 so that clamping device 7b is mounted on the rod 4a in a self-supporting manner.

It will be understood that each of the elements described above, or two or more together, may also find a useful application in other types of methods of securing the double-wall panel to the substructure of a greenhouse or the like differing from the types described above.

While the invention has been illustrated and described as embodied in a method of fastening a double-wall panel to the transversal rods of the substructure, it is not intended to be limited to the details shown, since various modifications and structural changes may be made without departing in any way from the spirit of the present invention.

Without analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of securing double-wall panels, each being formed by an upper cover plate and a lower plate spaced from each other and connected to each other by parallel cross-pieces to form hollow chambers, to a substructure having transversal rods by means of a plurality of fastening devices, each including a hook-shaped anchor insertable into at least one hole in the lower cover plate of the panel and a U-shaped clamping member connectable to the anchor and adapted to be placed over the respective rod for securing the lower cover plate of the panel to the respective transversal rod, the method comprising positioning one of the fastening devices on the transversl rod in the center of the lower plate and securing said one fastening device to the rod so as to rigidly hold it on said one rod to produce a central anchorage immovable in all directions, and positioning laterally of said one fastening device and at a distance therefrom on said transversal rod, at least one further fastening device, which is placed over said one rod and connected to the lower cover plate of the panel in a self-supporting manner.

2. The method as defined in claim 1, wherein each of the clamping members of all said fastening devices is placed over said one rod with a play, and wherein a distance bar is placed between said rod and the clamping member of said one fastening device producing the anchorage, to take up the play formed therebetween.

3. A fastening arrangement for securing double-wall panels, each being formed by an upper cover plate and a lower cover plate spaced from each other and connected to each other by parallel cross-pieces to form hollow chambers, to a substructure having transversal rods, comprising a plurality of fastening devices located on said transversal rods in spaced relation from each other and each including a hook-shaped anchor insertable into a least one hole in the lower cover plate of the panel, and U-shaped clamping member connectable to the anchor and adapted to be placed over the respective transversal rod, one of said fastening devices being placed on the transversal rod in the center of the plates forming the panel and further comprising a stirrup having a loop embracing said transversal rod and clamped on the U-shaped clamping member of said one fastening device.

4. The fastening arrangement as defined in claim 3, wherein said U-shaped clamping member of said one fastening device is formed with a recess through which said stirrup pases, said stirrup having a clamping strap supported on the anchor so as to clamp said anchor, said U-shaped member and said transversal rod together.

* * * * *